United States Patent [19]

Tanner

[11] 3,970,273
[45] July 20, 1976

[54] APPLIANCE FOOT WITH SECURE RESILIENT PAD

[75] Inventor: Jimmy D. Tanner, Des Peres, Mo.

[73] Assignee: Arundale, Inc., St. Louis, Mo.

[22] Filed: Jan. 10, 1975

[21] Appl. No.: 540,117

[52] U.S. Cl. .................. 248/24; 29/511; 248/188.4; 248/188.9; 264/249
[51] Int. Cl.² .................. F16F 15/00; B29C 19/00
[58] Field of Search ............... 29/453, 511; 248/24, 248/188.4, 188.9, 350; 264/249, 274

[56] References Cited
UNITED STATES PATENTS

| 412,199 | 10/1889 | McIlhenny | 248/188.9 X |
| 2,476,366 | 7/1949 | Grimm | 248/188.4 |
| 2,746,079 | 5/1956 | Zell | 29/511 UX |
| 3,299,933 | 1/1967 | Akashi | 29/511 UX |
| 3,575,288 | 4/1971 | Brucken | 248/188.4 |
| 3,868,079 | 2/1975 | Johnson | 248/188.9 |

FOREIGN PATENTS OR APPLICATIONS

| 549,470 | 4/1932 | Germany | 248/188.9 |
| 1,313,753 | 11/1962 | France | 248/188.9 |
| 251,207 | 4/1926 | United Kingdom | 248/188.9 |
| 15,046 | 11/1887 | United Kingdom | 248/188.9 |
| 13,419 | 7/1900 | United Kingdom | 248/188.9 |
| 1,135,333 | 12/1968 | United Kingdom | 248/188.9 |

Primary Examiner—Roy D. Frazier
Assistant Examiner—Lawrence J. Staab
Attorney, Agent, or Firm—Rogers, Eilers & Howell

[57] ABSTRACT

An appliance foot formed of molded polypropylene has a shaft and an enlarged head affixed at one end of the shaft. The shaft is threaded so that it may be threadingly engaged and adjusted in the base of a domestic appliance with the head depending downwardly from the appliance. The head has a hexagonal periphery adapted to be received in a wrench for adjustment of the shaft into and out of the body of an appliance. The center of the head has an annular recess into which the depending edge of a resilient non-slip pad is received. The pad extends outwardly beyond the head so that the pad is the weight bearing surface. The edge of the annular recess is crimped tightly over the pad to tightly engage the periphery thereof and to hold it firmly in the annular recess.

10 Claims, 4 Drawing Figures

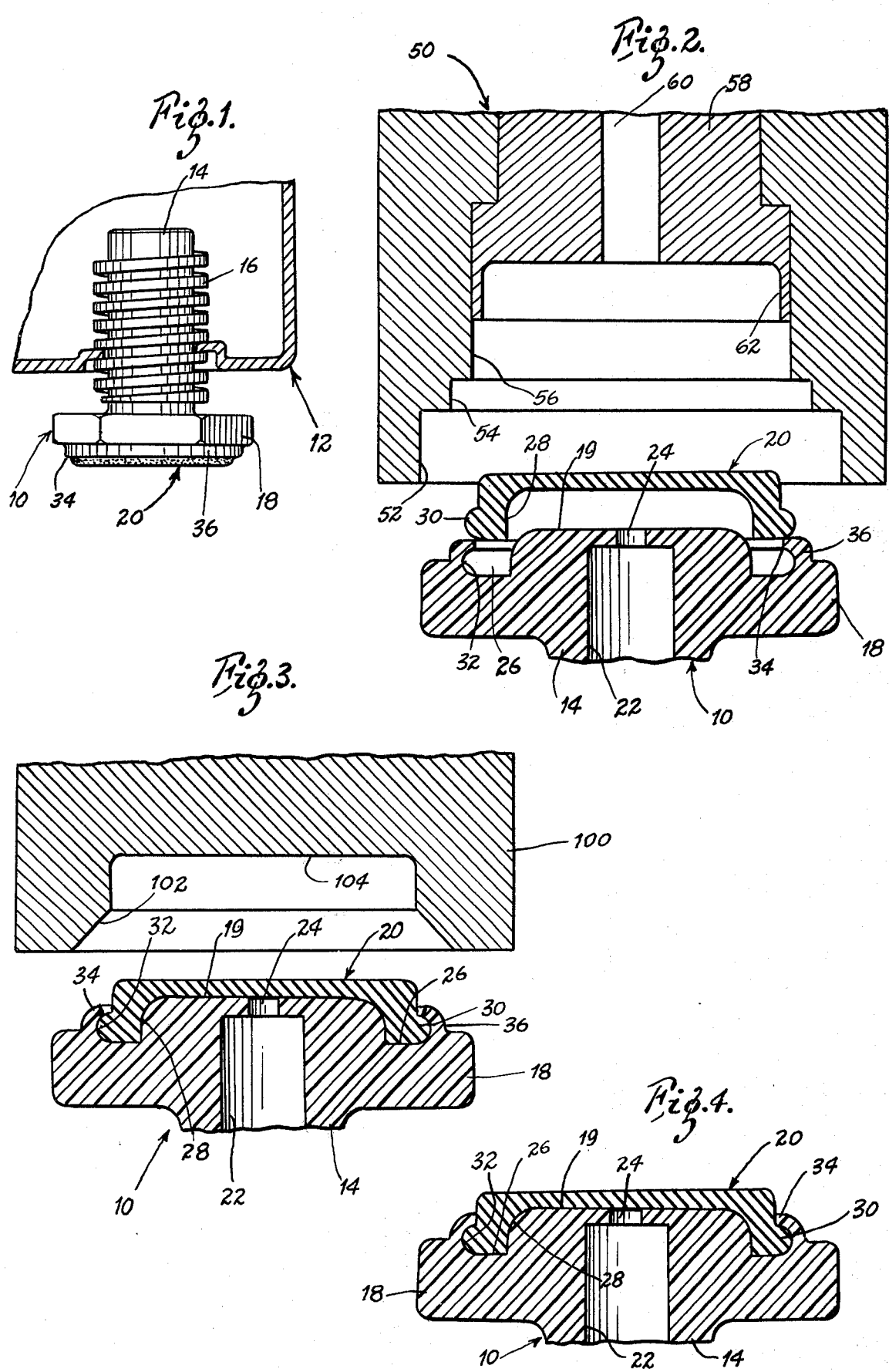

APPLIANCE FOOT WITH SECURE RESILIENT PAD

BACKGROUND AND SUMMARY OF THE INVENTION

Molded polypropylene or other plastic appliance feet are well known in the art, for example, as described in U.S. Pat. No. 3,575,288 issued to B. L. Brucken. Typical feet are formed of a molded plastic piece, usually polypropylene, having a hollow shaft, threaded on the exterior and having an enlarged head which receives a resilient pad. The threaded shaft of the foot is screwed into a cooperating threaded portion of an appliance so that the head and a portion of the shaft space the appliance from a supporting floor. The resilient pad placed at the lower portion of the head spaces the head from the floor and provides a non-skid pad which prevents the normal vibrations and oscillations of the appliance from moving the appliance to an out-of-level position. After having been leveled, by threading the shaft into the base of the appliance, the appliance will remain level and operation of the appliance will not be impaired with use by movement to an out-of-level position.

Prior feet which have used resilient pads have not held the pads firmly engaged enough on the head. With age, the rubber pads shrink or become loose on the appliance foot so that they can be easily removed from the foot by shear. This is a disadvantage where an appliance having the foot is moved by scooting it over a high friction surface, such as a concrete floor. The shear is sufficient to distort the rubber pad and remove it from the cooperating socket in the plastic foot. As a result, the pads often become lost from one or more feet and the feet are no longer effective to level or stabilize the appliance from its vibrations.

Applicant has devised a novel appliance foot having a resilient pad which does not become loose on the foot with age and which is retained in a cooperating portion of the foot with sufficient force that it cannot be easily removed by shear stresses applied to the pad. This new foot has a recess which receives a cooperating portion of the resilient rubber pad. The foot is tightly crimped down over a portion of the resilient pad so that the pad is tightly retained in the cooperating recess of the appliance foot.

The foot is preferably formed by injection molding of a suitable plastic material, such as polypropylene. The recess for receiving the pad is molded into the face of the foot. The rubber pad is installed in the recess while the foot is in a semi-plastic condition, preferably while the foot is still warm from the molding process. A cooperating portion of the pad is forced into the recess of the semi-plastic foot with a die. The foot, still semi-plastic, is placed in a second die which crimps the edge of the recess tightly against the pad. On cooling, the plastic foot shrinks somewhat, holding the pad even more firmly in the recess.

While it is preferred that the pad be installed while the foot is still warm from the molding operation, the pad can be installed in a foot which has been rewarmed.

By obtaining a tight crimp, applicant is able to produce a foot having an attached rubber pad which is retained in the pad, even when subjected to shear forces. The foot is effective to level an appliance and hold it in place under vibration even when age had deteriorated the normal resilient properties of the rubber.

DESCRIPTION OF THE DRAWINGS

FIG. 1 is a partial sectional view through an appliance base showing the improved appliance foot;

FIG. 2 is a sectional exploded view showing the head of the appliance foot, the resilient pad and the compressing die for installing the resilient pad;

FIG. 3 is a sectional view showing the head of the appliance foot with the installed resilient pad and the crimping die;

FIG. 4 is a sectional view of the head of the appliance foot showing the resilient pad installed and the head of the appliance foot crimped onto the resilient pad.

DESCRIPTION OF THE PREFERRED EMBODIMENTS

Referring in more detail to the drawings, in FIG. 1, an appliance foot 10 formed of polypropylene is shown assembled in the body of a household appliance 12. The foot has a central cylindrical shaft 14 having unitary molded threads 16 concentric to the shaft and at the lowermost end has a hexagonal head 18. On the face 19 of head 18 is affixed a resilient rubber pad 20.

As shown in more detail in FIGS. 2 through 4, foot 10 is preferably hollow and has openings 22 and 24 communicating longitudinally through the center of the foot so that air is not trapped underneath resilient pad 20 when it is installed as will be described. As shown in FIG. 4, resilient pad 20 is implanted in an annular groove 26 which is formed in the face 19 of foot 10. Groove 26 is concentric to the central longitudinal opening 22, 24 through the foot. Annular groove 26 may be of any desired shape, for example, rectangular or square, but is preferably circular. The edge of resilient pad 20 is formed in a shape to conform to the annular groove 26, but is preferably formed as a circular disc having a depending edge 28 with outward extensions 30 which are adapted to mate with recessed portion 32 of groove 26. Face 19 has a portion 34 which overlies undercut 32 of annular groove 26 and cooperates to enclose outwardly extending portion 30 of resilient pad 20. In the completely formed device, overlying portion 34 is pressed tightly down against resilient pad 20 to tightly contact outwardly extending portion 30 and thereby retain resilient pad 20 in place on foot 10. Shoulder 36 is formed at the periphery of portion 34.

To produce the device of the invention, the basic foot 10 without the resilient pad 20 is formed by a suitable conventional means, for example, by injection molding polypropylene or other suitable material with longitudinal openings 22, 24 molded in the device and with annular groove 26 formed in the molded device. A separate molding operation is used to form resilient pad 20 out of a hard rubber compound or other conventional nonskid material. While foot 10 is still warm after being removed from the injection molding machine, resilient pad 20 is implanted using a die 50. Die 50 has a chuck 52 which encircles and holds head 18 of foot 10. Spaced inwardly from chuck 52 is an intermediate chuck 54 for holding the shoulder 36 adjacent to overlying portion 34. Spaced further inwardly from intermediate chuck 54 is central chuck 56 for retaining resilient pad 20. Received centrally in die 50 is reciprocating piston 58 having air exhaust central bore 60.

To install the resilient pad 20 in foot 10, the foot is positioned with its shoulder 18 held in chuck 52 and with edge 36 held in chuck 54. Resilient pad 20 is held above face 19 of foot 10 in chuck 56. With the foot 10 firmly held in the die 50, piston 58 is moved downwardly so that edges 62 of piston 58 contact upper surface 38 of resilient pad 20 at its periphery and force depending edge 28 with outward extremity 30 into groove 26 and into mating relationship with undercut 32, as shown.

A crimping die 100 is used to crimp overlying portion 34 of shoulder 36 into tight engagement around outward extending portion 30 of resilient pad 20. Crimping die 100 has an inclined central face 102 and a central relieved portion 104 sized so that face 102 contacts portion 34 and allows entrance of resilient pad 20 into portion 104. The crimping operation is preferably performed while foot 10 is still warm and soft after having been removed from the mold.

To perform the crimping operation, the foot 10, with resilient pad 20 in place and with outward extension 30 firmly engaged in annular groove 32, is firmly held and die 100 is pressed downwardly over the face 19 of foot 10. On being reciprocated downwardly, face 102 contacts overlying portion 34 of shoulder 36. The die 100 is pressed downwardly with sufficient force that the inclined face 102 bends overlying portion 34 downwardly and inwardly to engage downward extending portion 28 and outwardly extending portion 30 of resilient pad 20 in a firm grip which tightly retains the resilient pads 20 in annular groove 26.

On being removed from the die and on cooling to ambient temperature, overlying portion 34 of foot 10 sets up with sufficient rigidity that the resilient pad is tightly maintained on the face 19 of foot 10 and will remain so when subjected to considerable shear parallel to the face of the resilient pad. For example, such as that occurring when an appliance having the foot herein described installed is moved in contact with a high friction surface such as a concrete floor.

It will be appreciated by one skilled in the art that many modifications could be made of the invention described herein without departing from the spirit thereof. It is intended that the invention should be limited only by the scope of the appended claims and not by the particular embodiments disclosed. annular

I claim:

1. A unitary molded appliance foot of relatively rigid material having a weight bearing face, a longitudinal portion extending outwardly from adjacent the weight bearing face and a resilient pad on the face, the face having a relieved portion, the relieved portion of the face having an undercut, the resilient pad having a dependent rim with an outwardly extending lip, the dependent rim being received in the relieved portion of the face and the outwardly extending lip being engaged in the undercut, the undercut having means to retain the outwardly extending lip in the undercut, the longitudinal extension having integrally molded threads about its periphery adapted to threadingly engage with a cooperating portion on an appliance when mounted thereon.

2. The foot of claim 1 wherein the foot is formed of molded polypropylene.

3. The foot of claim 1 wherein the relieved portion is annular.

4. The foot of claim 1 wherein the relieved portion is circular and is concentric to the major axis of the foot.

5. The foot of claim 1 wherein the relieved portion has means crimped tightly over the portion of the resilient pad which is engaged in the undercut.

6. The foot of claim 1 wherein the foot has a longitudinal opening communicating between the face of the foot beneath the resilient pad and the longitudinal extremity remote from the face.

7. The foot of claim 1 wherein the resilient pad is a disc having a dependent rim and the dependent rim has an outwardly extending lip.

8. The appliance foot of claim 1 wherein the foot has a hexagonal head portion adjacent to the weight bearing face.

9. The foot of claim 1 wherein the longitudinal portion extending outwardly from a location adjacent to the weight bearing face has means defining an opening extending longitudinally through the longitudinal portion and communicting through the face.

10. A unitary molded polypropylene appliance foot having a weight bearing face, a longitudinal portion extending outwardly from adjacent the weight bearing face and a resilient pad on the face, the longitudinal portion having means defining an opening extending axially therethrough, the opening communicating with means defining an opening through the face, the face having a relieved portion, the relieved portion of the face having an undercut, the undercut and relieved portion being annular and concentric about the major axis of the foot, the resilient pad being in the shape of a disc and having a dependent rim with an outwardly extending lip, the dependent rim of the disc being received in the relieved portion of the face and the outwardly extending lip being engaged in the undercut, the undercut having crimped means to firmly retain the outwardly extending lip in the undercut, the longitudinal extension having integrally molded threads about its periphery adapted to threadingly engage with a cooperating portion on an appliance when mounted thereon, the appliance foot having a shaped portion adjacent to the weight bearing face and concentric about the longitudinal axis of the foot, the shaped portion having means to cooperate with a turning means.

* * * * *